United States Patent
Wu et al.

(10) Patent No.: US 12,474,437 B2
(45) Date of Patent: Nov. 18, 2025

(54) FINE FREQUENCY OFFSET ESTIMATION FOR COHERENT DISTRIBUTED RADAR

(71) Applicant: NXP B.V., Eindhoven (NL)

(72) Inventors: Yan Wu, Eindhoven (NL); Wilhelmus Johannes van Houtum, Sint-oedenrode (NL)

(73) Assignee: NXP B.V., Eindhoven (NL)

( * ) Notice: Subject to any disclaimer, the term of this patent is extended or adjusted under 35 U.S.C. 154(b) by 414 days.

(21) Appl. No.: 18/145,560

(22) Filed: Dec. 22, 2022

(65) Prior Publication Data

US 2024/0210520 A1 Jun. 27, 2024

(51) Int. Cl.
*G01S 7/00* (2006.01)

(52) U.S. Cl.
CPC .................. *G01S 7/003* (2013.01)

(58) Field of Classification Search
CPC . G01S 7/003; G01S 7/354; G01S 7/40; G01S 13/003; G01S 13/343; G01S 13/584; G01S 13/87; G01S 7/356; G01S 7/4017; G01S 7/4091
See application file for complete search history.

(56) References Cited

U.S. PATENT DOCUMENTS

| | | | | |
|---|---|---|---|---|
| 11,009,598 | B2 * | 5/2021 | Dobrev | G01S 13/589 |
| 2016/0146931 | A1 * | 5/2016 | Rao | G01S 13/931 |
| | | | | 342/59 |
| 2018/0088221 | A1 * | 3/2018 | Yomo | G01S 7/003 |
| 2020/0300965 | A1 * | 9/2020 | Wu | G01S 7/42 |
| 2020/0408890 | A1 | 12/2020 | Klar | |
| 2021/0011121 | A1 | 1/2021 | Arbabian et al. | |

OTHER PUBLICATIONS

M. Gottinger et al., "Coherent Automotive Radar Networks: The Next Generation of Radar-Based Imaging and Mapping," in IEEE Journal of Microwaves, vol. 1, No. 1, pp. 149-163, Jan. 2021, doi: 10.1109/JMW.2020.3034475. (Year: 2021).*
M. Gottinger, et.al., "Coherent Full-Duplex Double-Sided Two-Way Ranging and Velocity Measurement Between Separate Incoherent Radio Units", IEEE Trans. on Microwave Theory and Techniques, vol. 67, pp. 2045-2061, May 2019.

(Continued)

*Primary Examiner* — Vladimir Magloire
*Assistant Examiner* — Yonghong Li

(57) ABSTRACT

Various embodiments relate to a bi-static radar system, including: first and second radar stations configured to: transmit first and second radar signals based upon a clock signal; wherein the first radar station receives a reflected second radar signal and the second radar station receives a reflected first radar signal; coherently process the reflected first and second radar signals to produce a first and second doppler frequency for first and second reference targets, wherein the first and second reference targets are is a detected target with the greatest signal strength; generate a frequency offset estimate based upon the average of the first and second doppler frequencies; frequency shift the reflected second radar signal by the frequency offset estimate to produce a corrected second radar signal; and coherently process the corrected second radar signal to produce first radar outputs from the first radar station.

15 Claims, 2 Drawing Sheets

(56) References Cited

OTHER PUBLICATIONS

M. Gottinger, et.al., "Coherent Automotive Radar Networks: The Next Generation of Radar-based Imaging and Mapping", IEEE Journal of Microwaves, vol. 1, No. 1, pp. 149-163, Jan. 2021.
U.S. Appl. No. 17/487,167; Not Yet Published; 26 pages (filed Sep. 28, 2021).
U.S. Appl. No. 17/712,445; Not Yet Published; 57 pages (filed Apr. 4, 2022).
U.S. Appl. No. 18/090,798; Not Yet Published; 32 pages (filed Dec. 29, 2022).

* cited by examiner

FINE FREQUENCY OFFSET ESTIMATION FOR COHERENT DISTRIBUTED RADAR

TECHNICAL FIELD

Various exemplary embodiments disclosed herein relate generally to fine frequency offset estimation for coherent distributed radar.

BACKGROUND

Coherent Distributed Radar (CDR) may be used in bi-static radar-scenarios. In such scenarios a common clock signal is used to generate the transmit signals. Issues may arise where there is a difference in the clock signal used to transmit signals by each of the bi-static radar transmitters. Fine frequency offset estimation between the two radar transmitters may be used to compensate the received bi-static signals for frequency differences in the two clock signals.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a bi-static radar system, including: a first radar station configured to transmit a first radar signal based upon a clock signal; a second radar station configured to: receive the clock signal from the first radar station; transmit a second radar signal based upon the clock signal; and receive a reflected first radar signal, wherein the first radar station is configured to: receive a reflected second radar signal; and a processor configured to: coherently process the reflected first radar signal to produce a first doppler frequency for a reference target, wherein the first reference target is a detected target with the greatest signal strength; coherently process the reflected second radar signal to produce a second doppler frequency for a second reference target, wherein the second reference target is a detected target with the greatest signal strength; generate a frequency offset estimate based upon the average of the first doppler frequency and the second doppler frequency when the first reference target and the second reference target are in the same range bin; frequency shift the reflected second radar signal by the frequency offset estimate to produce a corrected second radar signal; and coherently process the corrected second radar signal to produce first radar outputs from the first radar station.

Various embodiments are described, wherein the processor is further configured to: frequency shift the reflected first radar signal by the frequency offset estimate to produce a corrected first radar signal; and coherently process the corrected first radar signal to produce second radar outputs from the second radar station.

Various embodiments are described, wherein the second radar signal is a frequency-modulated continuous wave (FMCW) signal, and coherently processing the reflected second radar signal to produce a second doppler frequency for the reference target includes performing a first fast Fourier transform (FFT) of the reflected second radar signal and then performing a second FFT on an output of the first FFT.

Various embodiments are described, wherein coherently processing the corrected second radar signal to produce first radar outputs from the first radar station includes performing a third fast Fourier transform (FFT) of the corrected second radar signal and then performing a fourth FFT on the output of the third FFT.

Various embodiments are described, wherein generating a frequency offset based upon the first doppler frequency and the second doppler frequency includes adding the first doppler frequency to the second doppler frequency and dividing a result of the addition by 2.

Further various embodiments relate to a bi-static radar system, including: a first radar station configured to transmit a frequency-modulated continuous wave (FMCW) first radar signal based upon a clock signal; a second radar station configured to: receive the clock signal from the first radar station; transmit a second FMCW radar signal based upon the clock signal; and receive a reflected first FMCW radar signal; wherein the first radar station is configured to: receive a reflected second FMCW radar signal; a processor configured to: coherently process the reflected first radar FMCW signal to produce a first doppler frequency for a reference target, wherein the first reference target is a detected target with the greatest signal strength; coherently process the reflected second radar FMCW signal to produce a second doppler frequency for the reference target, wherein the second reference target is a detected target with the greatest signal strength; and generate a frequency offset estimate based upon the average of the first doppler frequency and the second doppler frequency when the first reference target and the second reference target are in the same range bin.

Various embodiments are described, wherein the processor is further configured to: frequency shift the reflected second radar FMCW signal by the frequency offset estimate to produce a corrected second radar FMCW signal; and coherently process the corrected second radar FMCW signal to produce first radar outputs from the first radar station.

Various embodiments are described, wherein the processor is further configured to: frequency shift the reflected first radar FMCW signal by the frequency offset estimate to produce a corrected first radar signal; and coherently process the corrected first radar FMCW signal to produce second radar outputs from the second radar station.

Various embodiments are described, wherein coherently processing the reflected second radar FMCW signal to produce a second doppler frequency for the reference target includes performing a first fast Fourier transform (FFT) of the reflected second radar FMCW signal and then performing a second FFT on an output of the first FFT.

Various embodiments are described, wherein coherently processing the corrected second radar FMCW signal to produce first radar outputs from the first radar station includes performing a third FFT on the corrected second radar FMCW signal and then performing a fourth FFT on an output of the third FFT.

Further various embodiments relate to a method for correcting a frequency offset in a bi-static radar system having a first radar station and a second radar station, including: transmitting, by the first radar station, a frequency-modulated continuous wave (FMCW) first radar signal based upon a clock signal; receiving, by the second radar station the clock signal from the first radar station; transmitting, by the second radar station, a second FMCW radar signal based upon the clock signal; receiving, by the second radar station, a reflected first FMCW radar signal; receiving, by the first radar station, a reflected second FMCW radar signal; coherently processing the reflected first radar FMCW signal to produce a first doppler frequency for a reference target, wherein the first reference target is a detected target with the greatest signal strength; coherently processing the reflected second radar FMCW signal to produce a second doppler frequency for the reference target, wherein the second reference target is a detected target with the greatest signal strength; and generating a frequency offset estimate based upon the average of the first doppler frequency and the second doppler frequency when the first reference target and the second reference target are in the same range bin.

Various embodiments are described, further including: frequency shifting the reflected second radar FMCW signal by the frequency offset estimate to produce a corrected second radar FMCW signal; and coherently processing the corrected second radar FMCW signal to produce first radar outputs from the first radar station.

Various embodiments are described, further including: frequency shifting the reflected first radar FMCW signal by the frequency offset estimate to produce a corrected first radar FMCW signal; and coherently processing the corrected first radar FMCW signal to produce second radar outputs from the second radar station.

Various embodiments are described, wherein coherently processing the reflected second radar FMCW signal to produce a second doppler frequency for the reference target includes performing a first fast Fourier transform (FFT) of the reflected second radar FMCW signal and then performing a second FFT on an output of the first FFT.

Various embodiments are described, wherein coherently processing the corrected second radar FMCW signal to produce first radar outputs from the first radar station includes performing a third FFT on the corrected second radar FMCW signal and then performing a fourth FFT on an output of the third FFT.

BRIEF DESCRIPTION OF THE DRAWINGS

In order to better understand various exemplary embodiments, reference is made to the accompanying drawings as listed below.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

A Fine Frequency Offset (FFO) estimation algorithm for Coherent Distributed Radar (CDR) applied in bi-static radar-scenarios. The FFO estimate may then be used to correct the received data. The state-of-the-art FFO estimation requires transmission of sequential upchirps and downchirps. This imposes extra complexity in the chirp-plan. To overcome this, in the proposed FFO estimation algorithm, the reciprocity of the bi-static radar scenes in CDR is used. Due to FFO between the two stations, the target velocity is shifted from the correct values. Thanks to reciprocity, the shifts in target velocities for the two bi-static radar scenes have the same magnitude but opposite signs, i.e., forming a mirror image around the correct target velocity. The FFO can then be estimated from the differences of the two bi-static target velocities and corrected, e.g., by using multiplication of a complex exponential. In this way, sequential upchirps and downchirps are not required, i.e., dedicated chirp-plans for the bi-static scenario, as commonly used in the start-of-the-art methods. Moreover, any strong target in the radar scene can be used for FFO estimation, therefore, saving the necessity of transmitting a dedicated reference target between the two radar stations using a separate dedicated link. The system requirement for this FFO estimation algorithm do not add any extra requirements for CDR systems. Moreover, the proposed algorithm can be also extended to multi-static radar scenarios, where it can be used for FFO estimation between any pair of the radar sensors A FFO estimation technique for wireless locating and velocity measurement between separate radio units will now be described. The idea presented here is applicable in wireless locating because it aids with coherent ranging, continuous phase tracking, and velocity measurement between wireless units that operate coherently.

Figure 1:
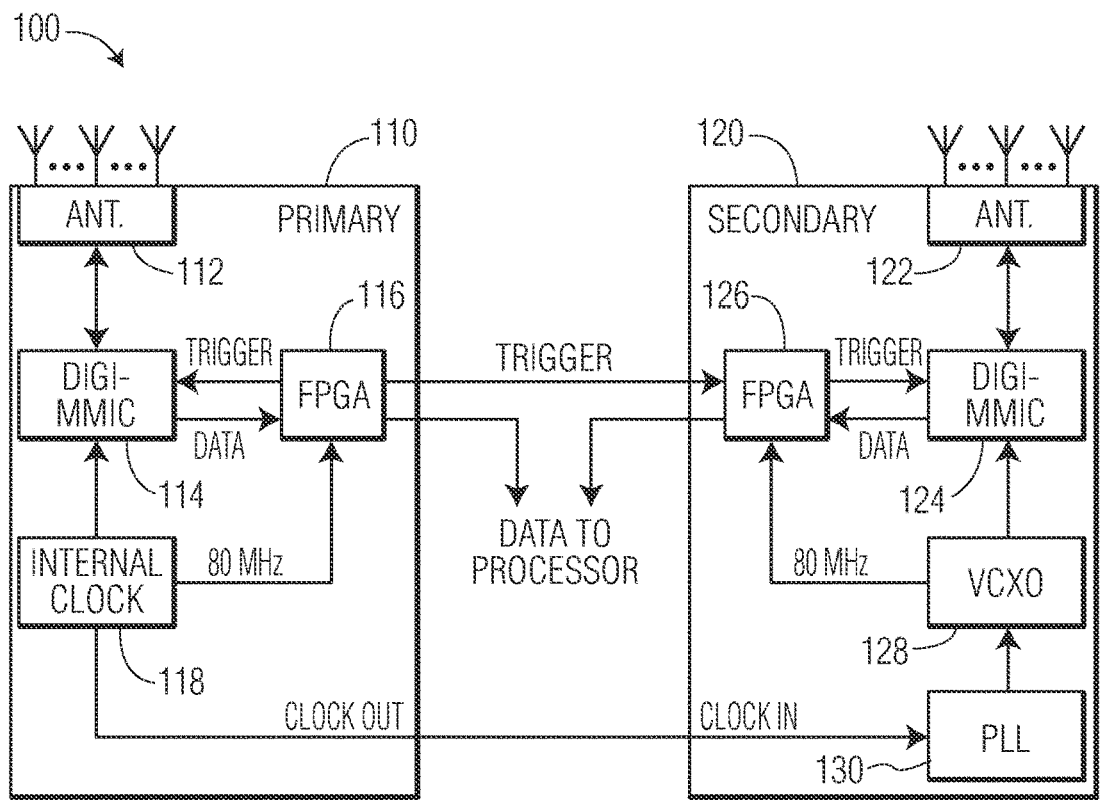
FIG. 1 illustrates a bi-static radar with two FMCW radar stations using a common clock.

One approach to enable coherent operations of both radar units is to share the same clock between the two stations, e.g., by sending the clock signal of a first station to a second station. FIG. 1 illustrates a bi-static radar with two FMCW radar stations using a common clock. The bi-static radar 100 includes first radar station 110 and second radar station 120. The first radar station 110 includes antenna 112, digital monolithic microwave integrated circuit (Digi-MMIC) 114, field programmable gate array (FPGA) 116, and internal clock 118. The internal clock 118 generates a clock signal that is applied to the Digi-MMIC 114 and the FPGA 116. The Digi-MMIC 114 implements the transmitter/receiver functions of the first radar station 110. The Digi-MMIC 114 provides a transmit signal to the antenna 112 which is radiated into space. The Digi-MMIC 114 also receives reflected radar signals from antenna 112 and processes the signal and provides data to the FPGA 116 for radar range and doppler processing to identify targets. The second radar station 120 includes antenna 122, Digi-MMIC 124, FPGA 126, voltage-controlled crystal oscillator (VCXO) 128, and phase-locked loop (PLL) 130. The second radar station 120 operates the same as the first radar station 110 except that it receives the clock signal from the first radar station 110. The PLL 130 receives the clock signal from first radar station 110 and controls the operation of the VCXO 128 to produce a clock signal to control the Digi-MMIC 124 and the FPGA 126. The FPGA 116 sends a trigger signal to the FPGA 126 to enable the bi-static operation. Further, both FPGA 116 and FPGA 126 produce data that will be sent to a processor for further processing as needed.

Although the same clock is shared between the two stations, the frequencies of the first radar station 110 and the second radar station 120 clocks may still differ by a very small amount due to practical imperfections, for example, distortion along the clock signal line, differences in the PLLs used to generate the transmit signals based on the clock signal, etc., thus resulting in a FFO. This FFO has to be corrected to ensure correct operation of the coherent distributed bi-static radar setup.

The state-of-the-art method for FFO estimation requires using sequential upchirps an downchirps. This adds additional requirements on chirp-plans, which is quite involved and complex to implement. Moreover, it is not compliant with the chirp-plans for conventional mono-static radar scenarios. A timing offset (TO) method has been described for distributed radar sensors. However, the estimation requires knowledge of the true distance (e.g., from the mono-static response, or from a dedicated reference target) without TO. A FFO estimation algorithm that exploits the reciprocity of the bi-static radar-scenes in CDR is disclosed herein. Due to FFO between the two radar stations, the target velocity is shifted from the correct values. Thanks to reciprocity, the shifts in target velocities for the two bi-static radar scenes have the same magnitude but opposite signs, i.e., forming a mirror image around the correct target velocity. The FFO may then be estimated from the differences of the two bi-static target velocities and corrected, e.g., by using multiplication of a complex exponential. In this way, a sequential upchirps and downchirps are not required, i.e., dedicated chirp-plans for the bi-static scenario, as commonly used in the start-of-the-art methods. Moreover, any strong target in the radar scene can be used for FFO estimation, therefore, saving the necessity of transmitting a dedicated reference target between the two radar stations using a separate dedicated link. Moreover, the disclosed FFO offset estimation algorithm may be also extended to multi-static radar scenarios, where it can be used for FFO estimation between any pair of the radar sensors.

Figure 2:
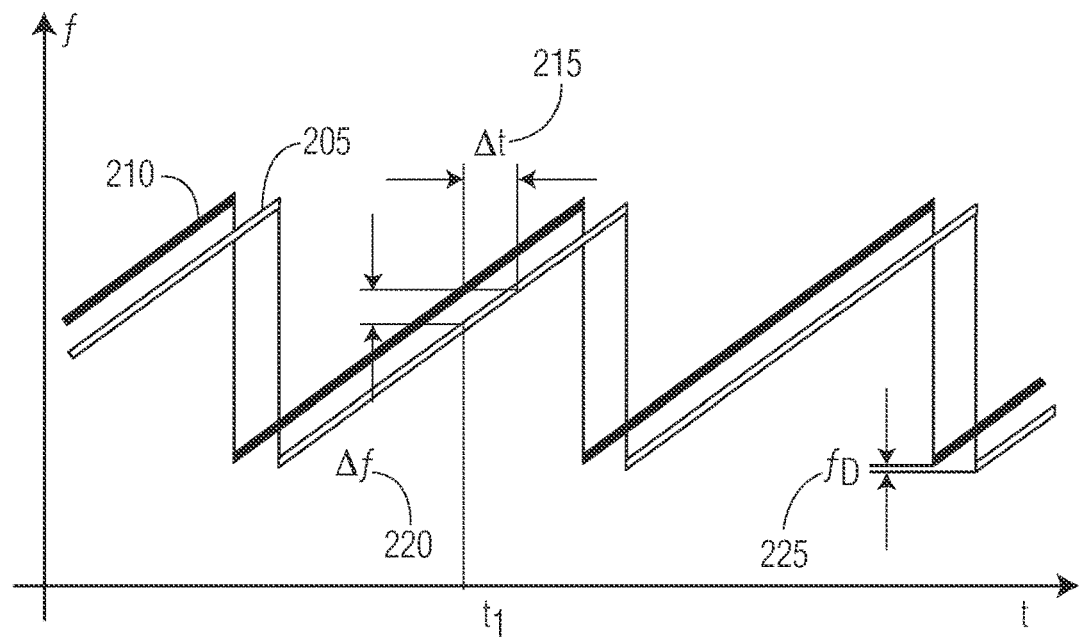
FIG. 2 illustrates a triangle wave modulation that may be used in the FMCW radar system.

FIG. 2 illustrates a triangle wave modulation that may be used in the FMCW radar system. As shown in FIG. 2 the received waveform 205 is a delayed replica of the transmitted waveform 210. The transmitted frequency is used to down-convert the receive signal to baseband, and the amount of frequency shift 220 between the transmit signal and the reflected signal increases with time delay 215 (distance). The time delay 215 is therefore a measure of the range; a small frequency spread is produced by nearby reflections, and a larger frequency spread corresponds with more time delay and a longer range. FIG. 2 also illustrates the effect of a doppler frequency shift 225 due to a velocity of the moving target.

With the advent of modern electronics, digital signal processing is used for most detection processing. The beat signals are passed through an analog-to-digital-converter (ADC), and digital processing is performed on the result, where the mathematical equations representing the generator/modulator and detector/demodulator, respectively will be shown below.

Figure 3:
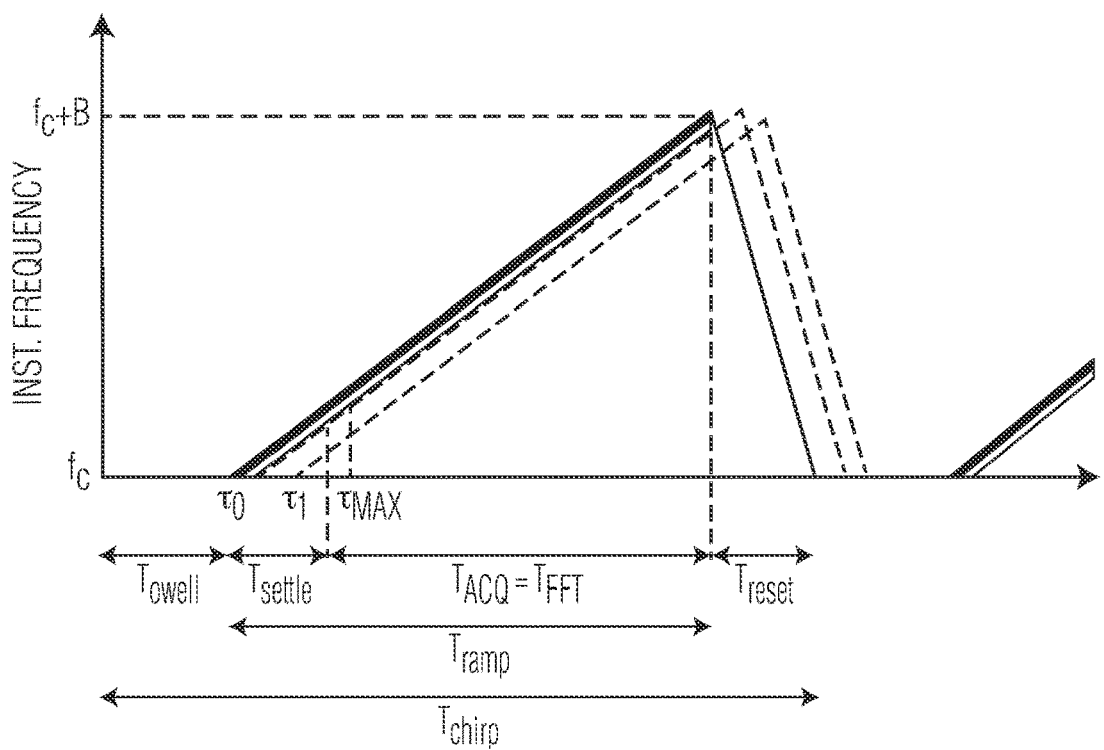
FIG. 3 illustrates the various parameters of the FMCW radar transmit signal.

In this subsection, the mathematical equations of the generator/modulator that generates the FMCW radar signals will be described. As explained in the literature, FMCW ranging for a linear ramp waveform is given in the following set of equations for the modulator-part, i.e., the FMCW-transmitter:

$$Tx: x(t) = \Re\left\{\exp\left(j2\pi\left(f_c t + \frac{1}{2}\mu t^2\right)\right)\right\} \quad \text{Eq. 1}$$

where $\Re\{\cdot\}$ is taking the real-part, $f_c$ is the carrier-frequency, $$\mu = \frac{B_{\mathit{eff}}}{T_{FFT}}$$

the chirp-rate (chirp-slope), $B_{\mathit{eff}}$ is the effective-bandwidth, and $T_{FFT}$ is the (effective) chirp-duration. FIG. 3 illustrates the various parameters of the FMCW radar transmit signal. The resulting instantaneous frequency becomes:

$$\mathit{Inst.Freq} = \frac{1}{2\pi}\frac{d}{dt}\left(2\pi\left(f_c t + \frac{1}{2}\mu t^2\right)\right) = f_c + \mu t \quad \text{Eq. 2}$$

FMCW detectors/demodulators will now be described. The received signal for FMCW radar, after a time-of-flight (ToF) of $\tau$, becomes:

$$Rx: r(t) = \Re\left\{\exp\left(j2\pi\left(f_c(t-\tau) + \frac{1}{2}\mu(t-\tau)^2\right)\right)\right\} \quad \text{Eq. 3}$$

Next, by mixing the received signal with the transmitted signal and applying low-pass filtering (LPF), yields:

$$y(t) = LPF(x(t)r^*(t)) = \Re\left\{\exp\left(j2\pi\left((\mu\tau)t + f_c\tau - \frac{1}{2}\mu\tau^2\right)\right)\right\}; \quad \text{Eq. 4}$$

and the beat-frequency $f_b$, i.e., the frequency of y(t) is:

$$f_b = \frac{1}{2\pi}\frac{d}{dt}\left(2\pi\left((\mu\tau)t + f_c\tau - \frac{1}{2}\mu\tau^2\right)\right) = \mu\tau. \quad \text{Eq. 5}$$

Lastly, the target-distance R then becomes;

$$R = \frac{1}{2}c_0\tau = \frac{1}{2}c_0\frac{f_b}{\mu} \quad \text{Eq. 6}$$

where $c_0$ is the phase velocity in free space, i.e., the speed-of-light ($\approx 3\cdot 10^8$ m/s).

Figure 4:
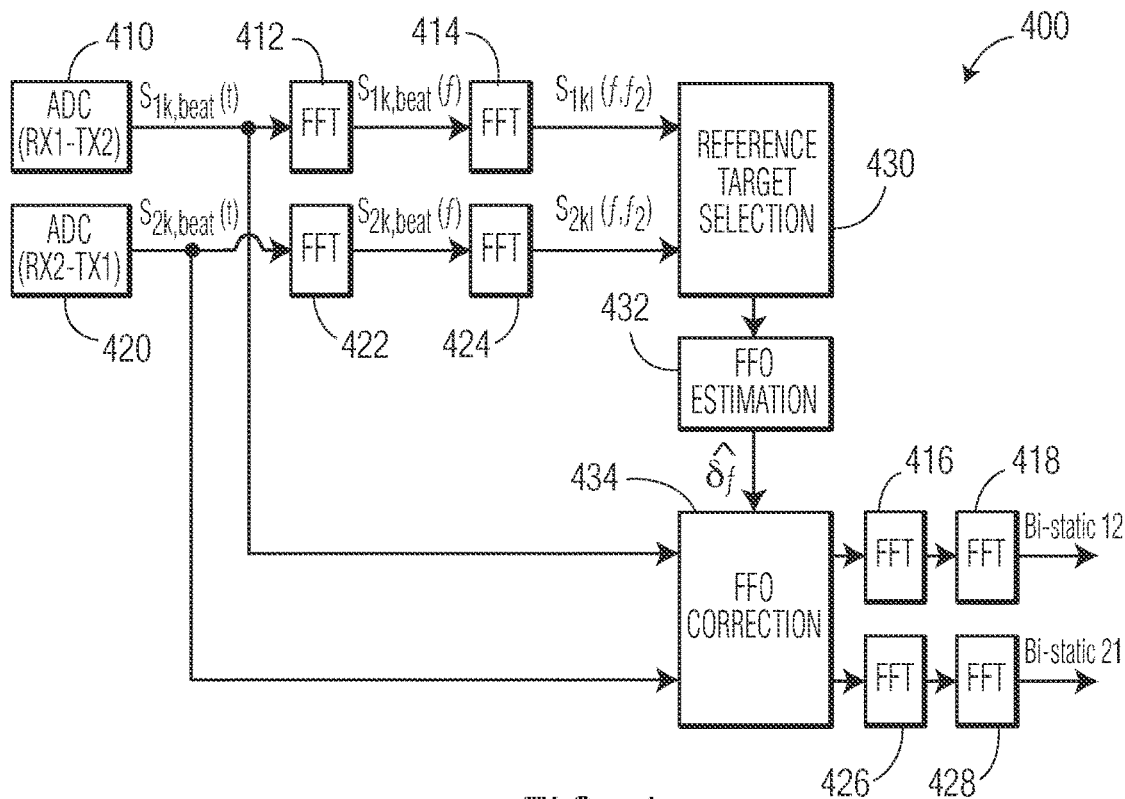
FIG. 4 illustrates a block diagram of the proposed FFO estimation algorithm and the corresponding example of the FFO correction.

Note that, for practical reasons, receive samples are not processed for brief periods ($T_{dwell}$, $T_{settle}$, $T_{reset}$) (see FIG. 3) after the modulation ramp begins because, e.g., incoming reflections will have modulation from the previous modulation cycle and the settling of circuitry like a PLL (this may also be seen in FIG. 4).

A mathematical model is given for the line-of-sight (LOS) operation with two stations. The radar station's time bases are defined by their respective LOs. All operations such as the start of an FMCW chirp, frequency increment, and ADC timing rely on this time base. To keep the model general for the time being, although the same clock is shared between the two stations, the first station S1 and second station S2 local oscillators (LOs) may still differ by a small amount due to practical imperfections. Local time increments generated by the LOs in the first station and the second station define the intra-chirp time (often referred to as fast time) as the mean of the local time in each station. Nevertheless, in the mathematical model it is assumed that within the intra-chirp time (fast-time) as well as within the inter-chirp time (slow-time), the time, frequency changes are corrected and may be neglected.

The mathematical model for the mixed signals with full-duplex transmission shows that the phase of the individual chirp for the first station $\Phi_{1k}(t)$, with relative drift in time $\delta_\tau$ between the two stations, timing-offset $\Delta\tau_{1k}$, frequency-offset $\Delta_f$ between both stations, and the RF bandwidth B becomes:

$$\Phi_{1k}(t) = 2\pi\left(f_c + \frac{\Delta f}{2} - \frac{B}{2}\right)\left(1 + \frac{\delta_t}{2}\right)t + $$

$$2\pi\mu\left(\frac{\left(1 + \frac{\delta_t}{2}\right)^2}{2}t^2 + \Delta\tau_{1k}\left(1 + \frac{\delta_t}{2}\right)t\right) + \Psi_{1k}\left(\left(1 + \frac{\delta_t}{2}\right)t\right) + \Theta_{1k} \quad \text{Eq. 7}$$

where $$\mu = \frac{B}{T_{sw}}$$

is the chirp-rate (chirp-slope) with $T_{sw}$ as the sweep-time, i.e., the chirp duration, $k\Sigma\{0, \ldots, K-1\}$ indicates the FMCW chirp number with K chirps are transmitted and received, $\Psi_{1k}(t)$ is the phase noise (PN), and $\Theta_{1k}$ is an arbitrary initial phase. Note that for the second station a similar mathematical model holds only with a sign reversal for the frequency-offset and the relative drift in time.

Now, with the above mathematical-model and some thorough manipulations, $$s_{1k,tx}(t) = A_1 \exp\{j\Phi_{1k}(t)\}, \quad \text{Eq. 8}$$

$$s_{2k,tx}(t) = A_2 \exp\{j\Phi_{2k}(t)\}$$

are transmitted and serve as references for down-conversion where $A_1$ and $A_2$ denote the chirp signal amplitudes. Hence, the signals received at the opposite station over the time-dependent wireless channel with propagation time $\tau_k$, Doppler frequency-shift $f_D$, and attenuation coefficient $\alpha$ becomes:

$$s_{2k,rx}(t) = \alpha A_1 \exp\{j\Phi_{1k}(t-\tau_k)\}\exp\{j2\pi f_D t\}, \quad \text{Eq. 9}$$

$$s_{1k,rx}(t) = \alpha A_2 \exp\{j\Phi_{2k}(t-\tau_k)\}\exp\{j2\pi f_D t\}.$$

Then, finally, the mixed signal of the first station may be stated as:

$$s_{1k,mix}(t) = s_{1k,tx}(t)(s_{1k,rx}(t))^* = A\exp \quad \text{Eq. 10}$$

$$\left\{j\left(2\pi\left((\delta_f - f_D)t + \left(f_c - \frac{B}{2}\right)\tau_k + \mu((\tau_0 + \Delta\tau + \delta_t kT_{sw})t + \delta_t t^2)\right) + \right.\right.$$

$$\left.\left. \Theta_{1k} - \Theta_{2k} + \Psi_{1k}\left(\left(1 + \frac{\delta_t}{2}\right)t\right) - \Psi_{2k}\left(\left(1 - \frac{\delta_t}{2}\right)(t - \tau_k)\right)\right)\right\}$$

where A is the signal amplitude, $$\delta_f = \Delta f + \delta_t\left(f_c - \frac{B}{2}\right)$$

is the total frequency offset, and with the ToF modeled as $\tau_k = \tau_0 + \tau_k'$ where $\tau_0$ and $\tau_k'$ are the initial ToF and the propagation-time change in the wireless channel, respectively. Note that for the second station a similar mathematical model holds only with a sign reversal for the Doppler frequency-shift, the initial ToF, and for the PN the interchange of the ToF $\tau_k$ between the first station and the second station.

Note that the ADCs in both radar units are controlled by their respective internal clock sources. Therefore, the mixing products are not available as sampled data. Sampling in the first station and second station is delayed by $\Delta\tau_{1k}$ and $\Delta\tau_{2k}$, respectively. That allows the FMCW beat signals $s_{1k,beat}(t)$ and $s_{2k,beat}(t)$ to be expressed (with some simplifications) as a time delayed versions of both mixed signals, respectively. In practical implementation of the CDR, some multiple access schemes, such as frequency-division multiple access (FDMA) is needed to separate the two bi-static radar responses. A common requirement for the CDR is that the radar scenes seen by the two bi-static responses are the same.

In the next section a closer look to the beat-signals in the frequency-domain will be taken when the FFO estimation algorithm is introduced. In addition, the above introduced mathematical model will use only those parameters that are relevant factors for the FFO estimation.

Now the proposed FFO estimation algorithm will be described. As both beat-signals described in the previous section are only available as sampled signals, a discrete Fourier transform is used. Because unknown parameters may be derived via discretized or continuous signals if the Nyquist sampling criterion holds, all computational steps are described with continuous time signals. FMCW chirps are of limited duration $t < T_{sw}$ in fast time. Therefore, a suitable window function w(t) might be multiplied with the time domain signals to reduce the sidelobe level in the frequency domain.

The following signal-model approach is used. For the mathematical model in continuous time, the Fourier transform $\mathcal{F}\{.\}$, after windowing, of the beat-signals for the first station and the second station are calculated as:

$$s_{1k,beat}(f) = \mathcal{F}\{w(t)s_{1k,beat}(t)\} = \quad \text{Eq. 11}$$

$$A[\delta\{f - ((\delta_f - f_D) + \mu(\tau_0 + \Delta\tau + \delta_t kT_{sw}))\} * \mathcal{F}\{w(t)\exp\{j2\pi\mu\delta_t t^2\}\} *$$

$$\mathcal{F}\{\exp\{j\Psi_{pn,1k}(t)\}\}] \cdot \exp\{j\gamma_{1k}\} \cdot \exp\left\{j\left(2\pi\left(f_c - \frac{B}{2}\right)\tau_k + \Theta_{1k} - \Theta_{2k}\right)\right\}$$

$$s_{2k,beat}(f) =$$

$$A[\delta\{f - ((\delta_f + f_D) + \mu(-\tau_0 + \Delta\tau + \delta_t kT_{sw}))\} * \mathcal{F}\{w(t)\exp\{j2\pi\mu\delta_t t^2\}\} * \mathcal{F}$$

-continued $$\{\exp\{j\Psi_{pn,2k}(t)\}\} \cdot \exp\{j\gamma_{2k}\} \cdot \exp\left\{j\left(-2\pi\left(f_c - \frac{B}{2}\right)\tau_k + \Theta_{1k} - \Theta_{2k}\right)\right\}$$

where $$\Psi_{pn,1k}(t) = \Psi_{1k}\left(\left(1 + \frac{\delta_t}{2}\right)t\right) - \Psi_{2k}\left(\left(1 + \frac{\delta_t}{2}\right)(t - \tau_k)\right),$$

$$\Psi_{pn,2k}(t) = \Psi_{1k}\left(\left(1 + \frac{\delta_t}{2}\right)(t - \tau_k)\right) - \Psi_{2k}\left(\left(1 + \frac{\delta_t}{2}\right)t\right),$$

and $\{\gamma_{1k}, \gamma_{2k}\}$ are the phase-shifts caused by the delays of the ADCs. Note, that $\{\Psi_{pn,1k}(t), \Psi_{pn,2k}(t)\}$ has negligible influence on the peak position. Hence, it may be approximated by $\{\mathcal{F}\{\exp\{j\Psi_{pn,1k}(t)\}\} \approx \delta(f), \mathcal{F}\{\exp\{j\Psi_{pn,2k}(t)\}\} \approx \delta(f)\}$ to estimate the unknown parameters. As can be seen the corresponding beat-signals are modelled by employing a relative time base, which depends on a timing offset $\Delta\tau$ and an LO drift $\delta_\tau$.

Now without loss of generality, and to simplify the equations, it is assumed that there is no LO drift, i.e., $\delta_\tau \approx 0$ and no timing offset, i.e., $\Delta\tau = 0$. Furthermore, the wireless channel is reciprocal and allows identical signal transmission in both directions. Then the Fourier transform of the IF beat signals can be given as:

$$s_{1k,beat}(f) = A \cdot W\{f - (\mu\tau_0 + (\delta_f - f_D))\} *$$

$$\mathcal{F}\{\exp\{j\Psi_{pn,1k}(t)\}\}\exp\{j2\pi f_c\tau_k\} \cdot \exp\{j(\varphi_{1k} - \varphi_{2k})\}$$

$$s_{2k,beat}(f) = A \cdot W\{f - (-\mu\tau_0 + (\delta_f + f_D))\} *$$

$$\mathcal{F}\{\exp\{j\Psi_{pn,2k}(t)\}\}\exp\{-j2\pi f_c\tau_k\} \cdot \exp\{j(\varphi_{1k} - \varphi_{2k})\}$$

These beat spectra of both units are centered around the frequency $f_{shift} = \delta_f$. This shift has to be determined to account for the FFO between the two stations. The beat spectra of the second station are mirrored at $f_{shift}$, and the complex conjugate is calculated as:

$$s_{1k,beat}(f - \delta_f) =$$ Eq. 13

$$A \cdot W\{f - \mu\tau_0 - \delta_f + f_D\} * \mathcal{F}\{\exp\{j\Psi_{pn,1k}(t)\}\}\exp\{j(2\pi f_c\tau_k + \psi_k)\}$$

$$s_{2k,beat}(f + \delta_f) =$$

$$A \cdot W\{f - \mu\tau_0 + \delta_f + f_D\} * \mathcal{F}\{\exp\{-j\Psi_{pn,2k}(t)\}\}\exp\{j(2\pi f_c\tau_k - \psi_k)\}$$

The beat spectra are simplified, where $\psi_k$ expresses the unknown initial phase of the FMCW chirps after calibration. After taking the 2nd FFT in the "slow-time", the distance-velocity bi-static signals are given by $$s_{1kl}((f - \delta_f), (f_2 - \delta_f)) = [A \cdot W\{f - \mu\tau_0 - \delta_f + f_D\} *$$ Eq. 14

$$\mathcal{F}\{\exp\{j\Psi_{pn,1k}(t)\}\}\right] \cdot \left[W_2\left(f_2 - \delta_f + f_c\frac{vT_{sw}}{c_0}\right)*$$

$$\mathcal{F}\{\exp\{j\Psi_{pn,1l}(t)\}\}\right] \cdot \exp\{j2\pi f_c\tau_k + \psi_k\}$$

$$s_{2kl}((f + \delta_f), (f_2 + \delta_f)) = [A \cdot W$$

$$\{f - \mu\tau_0 + \delta_f + f_D\} * \mathcal{F}\{\exp\{-j\Psi_{pn,2k}(t)\}\}\right] \cdot \left[W_2\left(f_2 + \delta_f + f_c\frac{vT_{SW}}{c_0}\right)*$$

$$\mathcal{F}\{\exp\{-j\Psi_{pn,2l}(t)\}\}\right] \cdot \exp\{j2\pi f_c\tau_k - \psi_k\}.$$

In practice, the FFO is much smaller than the frequency grid of the first FFT and thus may be considered negligible. In this case, the distance-velocity bi-static signals are given by $$s_{1kl}(f, (f_2 - \delta_f)) = [A \cdot W\{f - \mu\tau_0 + f_D\} *$$ Eq. 15

$$\mathcal{F}\{\exp\{j\Psi_{pn,1k}(t)\}\}\right] \cdot \left[W_2\left(f_2 - \delta_f + f_c\frac{vT_{SW}}{c_0}\right)*$$

$$\mathcal{F}\{\exp\{j\Psi_{pn,1l}(t)\}\}\right] \cdot \exp\{j2\pi f_c\tau_k + \psi_k\}$$

$$s_{2kl}(f, (f_2 + \delta_f)) = [A \cdot W\{f - \mu\tau_0 + f_D\} *$$

$$\mathcal{F}\{\exp\{-j\Psi_{pn,2k}(t)\}\}\right] \cdot \left[W_2\left(f_2 + \delta_f + f_c\frac{vT_{SW}}{c_0}\right)*$$

$$\mathcal{F}\{\exp\{-j\Psi_{pn,2l}(t)\}\}\right] \cdot \exp\{j2\pi f_c\tau_k - \psi_k\}.$$

Without FFO, the correct doppler frequency (velocity) of the target for both the first station and the second station are at $$f_{kl,doppler} = -f_c\frac{vT_{sw}}{c_0}.$$

Due to FFO, it can be clearly seen that the doppler frequency of the target at the first radar station is located at frequency $$f_{1kl,doppler} = -f_c\frac{vT_{sw}}{c_0} + \delta_f$$

while the doppler frequency of the same target at the second radar station is located at $$f_{2kl,beat} = -f_c\frac{vT_{sw}}{c_0} - \delta_f.$$

They form a mirror image $\pm\delta_f$ with the correct target $$-f_c\frac{vT_{sw}}{c_0}$$

in the middle.

This property may be used to estimate the FFO, in this case, the FFO can be estimated as:

$$\left.\begin{array}{l}\hat{\delta}_f = f_{1kl,doppler} - f_{kl,doppler} \text{ or,}\\ \hat{\delta}_f = f_{kl,doppler} - f_{2kl,doppler}\end{array}\right\} \Rightarrow \hat{\delta}_f = \frac{1}{2}(f_{1kl,doppler} - f_{2kl,doppler})$$ Eq. 16

The estimator in the left hand side of Eq. 16 requires knowledge of the doppler frequency (velocity) of the target without FFO. In a first approach, a reference target may be transmitted with a known distance and velocity using a dedicated link from the first station S1 to the second station S2 and vice versa. As the correct doppler frequency, without FFO, of the reference target is known at both the first station S1 and the second station S2, the FFO may be estimated by finding the actual doppler frequencies $f_{1/2kl,doppler}$ of the reference target and use estimator in the left hand side of Eq. 16.

However, this approach requires a dedicated link for transmission of reference target. This adds system complexity in implementation. In fact, thanks to reciprocity, for any target, due to FFO, the doppler frequencies at the two stations form mirror images with the correct doppler frequency in the middle. Therefore, any target may be selected as a reference target and used for FFO. In practice, it makes sense to select the strongest target as it has the largest signal to noise ratio. In this case, the FFO can be estimated as:

$$\hat{\delta}_f = \frac{1}{2}\left[\max_{f_2}\{\arg\{s_{1kl}(f,(f_2-\delta_f))\}\} - \max_{f_2}\{\arg\{s_{2kl}(f,(f_2+\delta_f))\}\}\right]. \quad \text{Eq. 17}$$

After the FFO is estimated, it can be corrected, e.g., by multiplying a complex exponential $\exp(\pm j2\pi \hat{\delta}_f t)$ to the time-domain beat signal $s_{1/2k,beat}(t)$. Moreover, for radar receivers with multiple receive antennas, the FFO can be estimated only once and the correction may be applied to all receive antennas in the same manner.

FIG. 4 illustrates a block diagram of the proposed FFO estimation algorithm and the corresponding example of the FFO correction. The FFO estimation algorithm 400 receives the signals $s_{1k,beat}(t)$ from the first ADC 410 and $s_{2k,beat}(t)$ from the second ADC 420 of the first radar station and the second radar station respectively. First FFTs 412 and 422 are applied to the signals $s_{1k,beat}(t)$ and $s_{2k,beat}(t)$ to produce the signals $s_{1k,beat}(f)$ and $s_{2k,beat}(f)$ respectively. Next, FFTs 414 and 424 are applied to the signals $s_{1k,beat}(f)$ and $s_{2k,beat}(f)$ to produce the signals $s_{1kl}(f,f_2)$ and $s_{2kl}(f,f_2)$ respectively. The signals $s_{1kl}(f,f_2)$ and $s_{2kl}(f,f_2)$ are a two dimensional signal indicating range and Doppler associated with each data point. The reference target selection processing 430 selects a target to use as a reference target as discussed above. This may be done in a variety of ways. For example, the strongest target found in the outputs of the second FFTs 414 and 424 may be selected as the reference target. These targets from each of the first radar station and the second radar station including their doppler information is passed to the FFO estimation processing 432. The FFO estimation processing 432 takes the Doppler information from the two reference targets and calculates the frequency offset $\delta_f$ between the first and second radar stations. This may be done using for example Eq. 17. The frequency offset $\delta_f$ may then be used to correct the signals signals $s_{1k,beat}(t)$ and $s_{2k,beat}(t)$ received from ADC 410 and ADC 420. These FFO corrections 434 may be done by multiplying the signals $s_{1k,beat}(t)$ and $s_{2k,beat}(t)$ by $\exp(\pm j2\pi \hat{\delta}_f t)$. Then this corrected signal is processed by the FFTs 416, 418, 426, 428 in the same manner as the FFTs 412, 414, 422, 424 were performed. This then results in two different bistatic radar outputs where FFO was applied to correct for frequency offsets between the two radar stations. The FFO estimation algorithm 400 may be implemented using software carried out on a processor, in dedicated hardware, or a combination of both.

As used herein, the term "non-transitory machine-readable storage medium" will be understood to exclude a transitory propagation signal but to include all forms of volatile and non-volatile memory. When software is implemented on a processor, the combination of software and processor becomes a single specific machine. Although the various embodiments have been described in detail, it should be understood that the invention is capable of other embodiments and its details are capable of modifications in various obvious respects.

Because the data processing implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Any combination of specific software running on a processor to implement the embodiments of the invention, constitute a specific dedicated machine.

It should be appreciated by those skilled in the art that any block diagrams herein represent conceptual views of illustrative circuitry embodying the principles of the invention.

What is claimed is:

1. A bi-static radar system, comprising:
   a first radar station configured to transmit a first radar signal based upon a clock signal;
   a second radar station configured to:
      receive the clock signal from the first radar station;
      transmit a second radar signal based upon the clock signal; and
      receive a reflected first radar signal,
   wherein the first radar station is configured to:
      receive a reflected second radar signal; and
   a processor configured to:
      coherently process the reflected first radar signal to produce a first doppler frequency for a first reference target, wherein the first reference target is a detected target with the greatest signal strength represented in the reflected first radar signal;
coherently process the reflected second radar signal to produce a second doppler frequency for a second reference target, wherein the second reference target is a detected target with the greatest signal strength represented in the reflected second radar signal;
generate a frequency offset estimate based upon the average of the first doppler frequency and the second doppler frequency when the first reference target and the second reference target are in the same range bin;
frequency shift the reflected second radar signal by the frequency offset estimate to produce a corrected second radar signal; and
coherently process the corrected second radar signal to produce first radar outputs from the first radar station.

2. The bi-static radar system of claim 1, wherein the processor is further configured to:
frequency shift the reflected first radar signal by the frequency offset estimate to produce a corrected first radar signal; and
coherently process the corrected first radar signal to produce second radar outputs from the second radar station.

3. The bi-static radar system of claim 1, wherein
the second radar signal is a frequency-modulated continuous wave (FMCW) signal, and
coherently processing the reflected second radar signal to produce the second doppler frequency for the second reference target includes performing a first fast Fourier transform (FFT) on the reflected second radar signal and then performing a second FFT on an output of the first FFT.

4. The bi-static radar system of claim 3, wherein
coherently processing the corrected second radar signal to produce the first radar outputs from the first radar station includes performing a third fast Fourier transform (FFT) on the corrected second radar signal and then performing a fourth FFT on the output of the third FFT.

5. The bi-static radar system of claim 1, wherein generating the frequency offset estimate based upon the average of the first doppler frequency and the second doppler frequency includes adding the first doppler frequency to the second doppler frequency and dividing a result of the addition by 2.

6. A bi-static radar system, comprising:
a first radar station configured to transmit a first radar frequency-modulated continuous wave (FMCW) radar signal based upon a clock signal;
a second radar station configured to:
receive the clock signal from the first radar station;
transmit a second radar FMCW signal based upon the clock signal; and
receive a reflected first radar FMCW signal;
wherein the first radar station is configured to:
receive a reflected second radar FMCW signal;
a processor configured to:
coherently process the reflected first radar FMCW signal to produce a first doppler frequency for a first reference target, wherein the first reference target is a detected target with the greatest signal strength represented in the first radar FMCW signal;
coherently process the reflected second radar FMCW signal to produce a second doppler frequency for a second reference target, wherein the second reference target is a detected target with the greatest signal strength represented in the second radar FMCW signal; and
generate a frequency offset estimate based upon the average of the first doppler frequency and the second doppler frequency when the first reference target and the second reference target are in the same range bin.

7. The bi-static radar system of claim 6, wherein the processor is further configured to:
frequency shift the reflected second radar FMCW signal by the frequency offset estimate to produce a corrected second radar FMCW signal; and
coherently process the corrected second radar FMCW signal to produce first radar outputs from the first radar station.

8. The bi-static radar system of claim 7, wherein the processor is further configured to:
frequency shift the reflected first radar FMCW signal by the frequency offset estimate to produce a corrected first radar signal; and
coherently process the corrected first radar FMCW signal to produce second radar outputs from the second radar station.

9. The bi-static radar system of claim 6, wherein
coherently processing the reflected second radar FMCW signal to produce the second doppler frequency for the second reference target includes performing a first fast Fourier transform (FFT) on the reflected second radar FMCW signal and then performing a second FFT on an output of the first FFT.

10. The bi-static radar system of claim 9, wherein
coherently processing the corrected second radar FMCW signal to produce first radar outputs from the first radar station includes performing a third FFT on the corrected second radar FMCW signal and then performing a fourth FFT on an output of the third FFT.

11. A method for correcting a frequency offset in a bi-static radar system having a first radar station and a second radar station, comprising:
transmitting, by the first radar station, a first radar frequency-modulated continuous wave (FMCW) signal based upon a clock signal;
receiving, by the second radar station the clock signal from the first radar station;
transmitting, by the second radar station, a second radar FMCW signal based upon the clock signal;
receiving, by the second radar station, a reflected first radar FMCW signal;
receiving, by the first radar station, a reflected second radar FMCW signal;
coherently processing the reflected first radar FMCW signal to produce a first doppler frequency for a first reference target, wherein the first reference target is a detected target with the greatest signal strength represented in the first radar FMCW signal;
coherently processing the reflected second radar FMCW signal to produce a second doppler frequency for a second reference target, wherein the second reference target is a detected target with the greatest signal strength represented in the second radar FMCW signal; and
generating a frequency offset estimate based upon the average of the first doppler frequency and the second doppler frequency when the first reference target and the second reference target are in the same range bin.

12. The method of claim 11, further comprising:
frequency shifting the reflected second radar FMCW signal by the frequency offset estimate to produce a corrected second radar FMCW signal; and
coherently processing the corrected second radar FMCW signal to produce first radar outputs from the first radar station.

13. The method of claim 12, further comprising:
frequency shifting the reflected first radar FMCW signal by the frequency offset estimate to produce a corrected first radar FMCW signal; and
coherently processing the corrected first radar FMCW signal to produce second radar outputs from the second radar station.

14. The method of claim 13, wherein
coherently processing the reflected second radar FMCW signal to produce the second doppler frequency for the second reference target includes performing a first fast Fourier transform (FFT) on the reflected second radar FMCW signal and then performing a second FFT on an output of the first FFT.

15. The method of claim 14, wherein
coherently processing the corrected second radar FMCW signal to produce the first radar outputs from the first radar station includes performing a third FFT on the corrected second radar FMCW signal and then performing a fourth FFT on an output of the third FFT.

* * * * *